Oct. 28, 1969   C. M. KEARL ETAL   3,474,640
HOUSEHOLD REFRIGERATOR CABINET CONSTRUCTION
Filed May 23, 1968
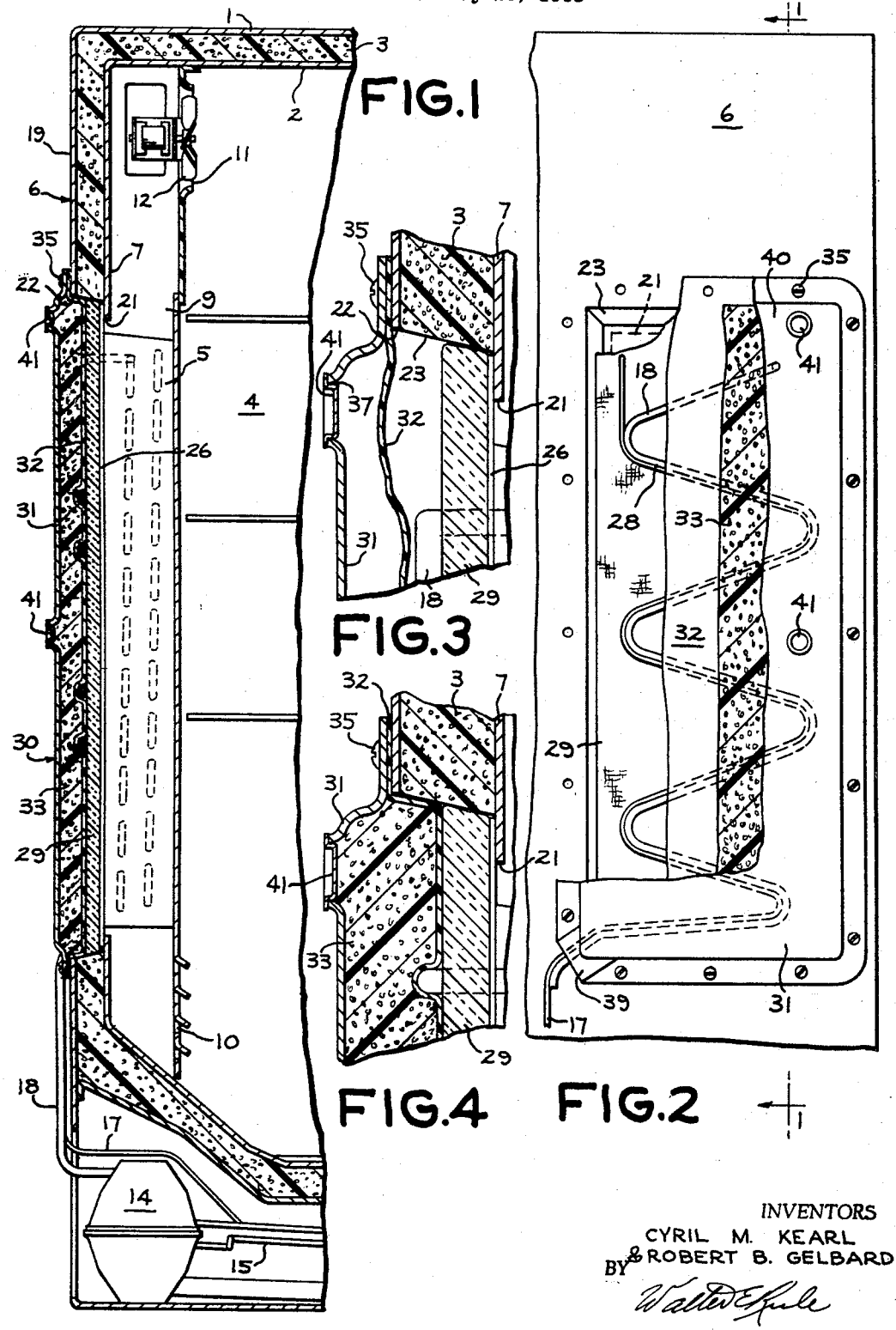
INVENTORS
CYRIL M. KEARL
& ROBERT B. GELBARD
BY
THEIR ATTORNEY

United States Patent Office 3,474,640
Patented Oct. 28, 1969

3,474,640
HOUSEHOLD REFRIGERATOR CABINET
CONSTRUCTION
Cyril M. Kearl, Wheaton, Ill., and Robert B. Gelbard,
Louisville, Ky., assignors to General Electric Company,
a corporation of New York
Filed May 23, 1968, Ser. No. 731,440
Int. Cl. F25d 11/00, 23/06
U.S. Cl. 62—449                                              6 Claims

ABSTRACT OF THE DISCLOSURE

A refrigerator cabinet comprising insulated walls defined by a casing and a liner within and spaced from the casing and bonded thereto by rigid foam insulation includes an opening in one wall for insertion of an evaporator component into the cabinet. The opening is closed by a removable unitary access cover comprising a plate secured to the casing and a sheet of flexible plastic material in engagement with the walls defining the opening. The space between the cover plate and the sheet is filled with foamable insulation formed in situ so that the expansion of the foam insulation causes the sheet to conform to the wall structure of the opening.

BACKGROUND OF THE INVENTION

Household refrigerators normally comprise a cabinet composed of an outer casing, a liner forming a storage compartment and spaced from the casing and insulating material filling the space between the casing and liner. The refrigeration system for cooling the storage compartment comprises a unitary structure including an evaporator and a refrigerant condensing unit. The evaporator is mounted within the cabinet and the condensing unit is mounted in a machinery compartment which is usually at the base of the cabinet. It is desirable to design such cabinets in a manner such that the refrigerating unit can be removed from the cabinet for servicing or replacement. When glass wool is employed as the insulating material, some of the glass wool insulation can be removed and thereafter replaced for the purpose of separating the refrigerating unit from the cabinet. In recent years rigid foam insulation, such as a polyurethane foam insulation, has been substituted for glass wool. As such insulation is normally formed in situ between the casing and liner and adheres to the surfaces thereof, the direct substitution of the foam insulation for the glass wool insulation has made it impossible to remove the refrigeration system as a unit without destroying the foam insulation. In order to solve this problem, it has been proposed, as taught for example in Patent 3,150,796 Hocking et al. issued Sept. 29, 1964, to enclose or cover the evaporator component of the refrigeration system or any other component thereof extending into or through the foam insulation with a plurality of layers of paper or glass fiber which are not penetrated by the foam during the formation of the insulation and which will therefore permit separation of the refrigeration unit from the cabinet per se. It has also been proposed, as described in Patent 3,078,003, Kesling issued Jan. 19, 1963, to cover a component of a refrigerator cabinet such as a liner which may be desirable to remove with polyethylene sheet material prior to the foaming operation, some of this sheet material acting as a divider or parting medium which prevents the foam from adhering to the surface protected by the polyethylene sheet.

However both of these approaches limit the design possibilities and involve the additional problem of having to form most or all of the foam insulation after the refrigerating unit has been assembled in the cabinet.

SUMMARY OF THE INVENTION

The present invention is directed to a refrigerator including a cabinet which comprises a liner bonded to an outer case by foam insulation and which is so designed that the refrigeration system is removably assembled with the cabinet component. More specifically, the refrigerator of the present invention comprises a cabinet including an insulated wall defined by a casing and a liner bonded together by rigid foam insulation with one of the walls having an opening therein for the insertion into the insulated cabinet of the evaporator component of a refrigeration system. The opening in the liner is slightly smaller than the opening in the casing and the evaporator includes a back plate adapted to engage the outer surface of the liner when the evaporator is positioned in the cabinet. A removable access cover for closing the opening comprises a cover plate removably secured to the casing and a sheet of flexible plastic material having its edge portions clamped between the casing and the cover plate and its central portions extending into the opening in engagement with the side walls of the opening and the adjacent surfaces of the evaporator component. The space between the cover plate and the plastic sheet of flexible material is filled with foam insulation formed by introducing a foamable insulating material into the space between the cover plate and the sheet of material after the mounting thereof on the cabinet whereby the expansion of the foamable insulation presses the sheet material into engagement with the opening side walls and the outer surface of the evaporator component.

BRIEF DESCRIPTION OF DRAWING

FIGURE 1 is the vertical sectional view of a refrigerator cabinet incorporating the present invention and taken generally along line 1—1 of FIGURE 2;

FIGURE 2 is a rear view partially broken away of part of the cabinet shown in FIGURE 1;

FIGURE 3 is an enlarged sectional view of a portion of the cabinet wall structure illustrating one step in the manufacture of the refrigerator; and FIGURE 4 is a view similar to FIGURE 3 illustrating a subsequent step in the manufacture of the refrigerator cabinet.

DESCRIPTION OF THE PREFERRED EMBODIMENT

With particular reference to FIGURE 1 of the accompanying drawing, there is shown a refrigerator comprising a cabinet structure including a casing 1 and liner 2 spaced from one another with the space between the casing and liner filled with a foamed insulation 3 bonding the liner to the casing. The liner 2 defines a storage compartment 4 for storage at refrigerating temperatures.

An evaporator 5 extending vertically along the rear insulated wall 6 of the cabinet or more specifically along the rear liner wall 7 is contained within a vertical chamber or duct 9 having an air inlet 10 at the bottom thereof and an air outlet 11 at the top. By this arrangement, compartment air is circulated by a fan 12 through the inlet 10 over the evaporator 5 and through the outlet 11 into the compartment 4.

The evaporator 5 forms part of a hermetic refrigeration system including a condensing means comprising a compressor 14 and a condenser 15 positioned in the machinery compartment 16 at the lower portion of the cabinet. The compressor 14, condenser 15, a capillary flow restrictor 17, evaporator 5 and a suction line 18 are connected in closed series-flow relationship in the well kown manner.

In accordance with the present invention the cabinet comprising the casing 1, and the liner 2 bonded together by the foamed insulation 3 is so designed that the refrigeration system, as a complete subassembly, can be removably mounted in the foamed cabinet. To this end the rear wall 7 of the liner is formed to include a rectangular opening 21 which is large enough to accommodate the evaporator 5 and a similar but somewhat larger opening 22 is provided in the corresponding area of the casing back wall 19.

After the casing 1 and liner 2 are assembled in their proper relative positions and ready for the introduction of the foamed insulation 3, a rectangular plug (not shown) is inserted through the opening 22 and into engagement with the rear wall 7 of the liner in overlapping relationship with the edges thereof adjacent the opening 21 to seal this area during the foaming operation. Preferably the plug is of a tapered configuration so that the foamable insulation contacting the edges of the plug will provide tapered side walls 23 extending from the edges of the opening 22 to the liner 3 in spaced relationship with the edges of the opening 21. The plug of course should include a surfacing of polyethylene or the like to prevent adhesion of the foam thereto as it forms and solidifies.

After the foamed insulation has set, the plug is removed and the cabinet is then ready to receive the refrigeration system.

The refrigeration system, as a complete subassembly, is adapted to be mounted from the rear of the cabinet by inserting the evaporator 5 through the access opening defined by the liner opening 21, the case opening 22, and foam side walls 23 while the condensing unit including the compressor 14 and the condenser 15 are inserted into the opening in the rear wall of the machinery compartment.

For properly positioning the evaporator 5 within the compartment 4 or more specifically within the duct 9, the evaporator 5 is provided with a backing plate 26 secured thereto and having dimensions slightly larger than the liner opening 21 so that while the evaporator 5 passes through the opening 21 in the liner rear wall 7, the edges of the backing plate 26 will engage or overlap the portions of the liner wall 7 surrounding the opening 21. By means of suitable screws or the like, the backing plate 26 is secured to the outer surface of the liner 21.

Also, in accordance with the preferred embodiment of the invention, the heat exchange portion of the suction line 18 and capillary line 17 between the evaporator and the condensing unit is of substantial length and arranged entirely within the opening in the rear wall 6. For example, this heat exchange portion generally indicated by the number 28 is in serpentine form and is spaced from the evaporator back plate 26 as illustrated in FIGURES 3 and 4 of the drawing in order to cut down heat exchange between this portion of the refrigeration system and the evaporator. A layer of insulating material 29 which may be either glass fiber or a slab of foam insulation is inserted in this space between the heat exchange section of the suction line and capillary and the back plate 26 to further decrease the flow of heat between these two components. The insulated material 29 may be considered part of the evaporator component when it is mounted in the cabinet.

After mounting of the evaporator, by means of the back plate 26 on the liner wall 7, the access opening is completely sealed and further insulated by means of removable access cover generally indicated by the numeral 30 and including a metal cover plate 31 and a flexible plastic sheet material 32 which in the final assembly are spaced from one another with the space there-between completely filled with a foam insulation 33.

In order to obtain a complete sealing of the opening and yet provide for removal of the cover plate 30 in the event that access to or removal of the evaporator is required, the access cover is foamed after securing the sheet material 32 and the cover plate 31 to the casing rear wall 19. More specifically, as shown in FIGURE 3, of the drawing the sheet material 32, such as a polyethylene sheet, is loosely positioned over the opening 22 in the casing rear wall 19 with the edges of the sheet material overlying the adjacent edges of the casing wall 19. The cover plate 31 is then placed in position and secured to the casing by fastening means such as screws 35. Thus the edges of the sheet material 32 are anchored between the cover plate 31 and the cabinet casing rear wall 19. Thereafter the space between the cover plate 31 and the sheet material 32 is filled with a fluid foamable insulating material introduced through one or more pour holes 37 in the amount such that expansion of this foamable insulating material completely fills this space and presses the plastic sheet material 32 into intimate engagement with the outer surface of the slab insulation 29, the suction and capillary tubes and the side walls 23 of the adjacent cabinet insulating material 3. As the sheet material 32 does adhere to foam insulation but not to any of the surfaces within the opening, the access cover is a unitary member comprising the cover plate, the foam insulation and the sheet material 32 and can be removed, if removal is required, from the cabinet.

Prior to the foaming operation, the portion of the cover plate 30 indicated by the numeral 39 in FIGURE 2 which is offset to provide a passage for the capillary 17 and suction line 18 through the cabinet wall is filled with a suitable sealing material such as Permagum which serves to close this opening and maintain the flexible sheet material 32 in engagement with the cover plate at this point during the foaming operation.

Also one or more openings such as the opening 40 may be provided in the upper portion of the cover plate as air release means during the foaming operation so that the pour holes 37 may be closed by suitable caps 41 immediately after the foamable material has been introduced.

What we claim as new and desire to secure by Letters Patent of the United States is:

1. A refrigerator cabinet comprising insulated walls defined by a casing and a liner within and spaced from said casing and bonded thereto by rigid foam insulation,
   one of said walls having an opening therein for insertion into said cabinet of a refrigerant component of a refrigeration system, said component including an evaporator having a back plate and a refrigerant conduit connecting said evaporator to a refrigerant condensing means,
   said back plate engaging the outer surface of said liner to position said evaporator in said cabinet adjacent said liner,
   a removable access cover for closing said opening comprising a cover plate secured to said casing, a sheet of flexible material between said cover plate and said back plate and a body of foam insulation formed in place between said back plate and said sheet, expansion of said body of foam insulation to fill the space between said back plate and cover plate causing said sheet to engage the side walls of said opening and said evaporator component.

2. The cabinet of claim 1 in which said refrigeration system includes capillary and suction lines arranged in serpentine configuration within said opening.

3. The cabinet of claim 2 comprising a preformed layer of insulation between said tubes and said back plate.

4. A refrigerator cabinet comprising insulated walls defined by a casing and a liner within and spaced from said casing and bonded thereto by rigid foam insulation,
   one of said walls having an opening extending through said casing, insulation and liner for insertion into said cabinet of an evaporator including a back plate and a refrigerant conduit connecting said evaporator to a refrigerant condensing means,
   said back plate engaging the outer surface of said liner to position said evaporator in said cabinet adjacent said liner, a removable access cover for closing said opening comprising a cover plate secured to said casing, a sheet of flexible material having its edge portions extending between said casing and said cover plate and a central portion spaced from said cover plate and engaging the side walls of said opening and said evporator component, the space between said cover plate and said sheet being filled with foam insulation formed in place by introducing a foamable insulating material into the space between said cover plate and said sheet after securing said cover plate and said sheet to the said casing.

5. The cabinet of claim 4 which includes capillary and suction lines in heat exchange relationship within said opening between said access cover and said backplate.

6. The cabinet of claim 5 including preformed insulation separating said lines from said backplate.

References Cited
UNITED STATES PATENTS

| | | | |
|---|---|---|---|
| 3,005,321 | 10/1961 | Devery | 62—450 |
| 3,216,217 | 11/1965 | Kesling | 62—449 |
| 3,261,173 | 7/1966 | Gould | 62—449 |

WILLIAM J. WYE, Primary Examiner

U.S. Cl. X.R.

62—298